US006938903B1

(12) United States Patent
Haimer

(10) Patent No.: US 6,938,903 B1
(45) Date of Patent: Sep. 6, 2005

(54) TOOL HOLDER FOR A TOOL, ESPECIALLY A BORING, MILLING OR GRINDING TOOL, WHICH CAN BE ROTATED ABOUT A ROTATIONAL AXIS

(75) Inventor: Franz Haimer, Hollenbach-Igenhausen (DE)

(73) Assignee: Franz Haimer Maschinenbau KG, Hollenbach-Igenhausen (DE)

( * ) Notice: Subject to any disclaimer, the term of this patent is extended or adjusted under 35 U.S.C. 154(b) by 180 days.

(21) Appl. No.: 10/332,974

(22) PCT Filed: Jul. 14, 2000

(86) PCT No.: PCT/EP00/06761

§ 371 (c)(1),
(2), (4) Date: Jun. 6, 2003

(87) PCT Pub. No.: WO02/05993

PCT Pub. Date: Jan. 24, 2002

(51) Int. Cl.⁷ .............................................. B23B 31/30
(52) U.S. Cl. ................................ 279/4.03; 279/4.06
(58) Field of Search ............................ 279/4.03, 4.05, 279/4.06, 139

(56) References Cited

U.S. PATENT DOCUMENTS

| 3,663,027 A | * | 5/1972 | Klipping ................... 279/4.03 |
| 3,762,730 A | * | 10/1973 | Cameron ................... 279/2.07 |
| 3,989,260 A | * | 11/1976 | Zonkov et al. ............. 279/4.01 |
| 5,462,293 A | * | 10/1995 | Samelius et al. .......... 279/4.03 |
| 6,224,067 B1 | * | 5/2001 | Lindstrom .................. 279/4.09 |
| 6,488,285 B1 | | 12/2002 | Allard |
| 2004/0052598 A1 | * | 3/2004 | Haimer ....................... 408/240 |

FOREIGN PATENT DOCUMENTS

| DE | 4015149 A | * | 11/1991 | ........... B23B 31/02 |
| DE | 19708983 A1 | * | 9/1998 | ......... B23B 31/117 |
| DE | 19926152 A1 | * | 12/2000 | ......... B23B 31/117 |
| DE | 10125154 A1 | * | 1/2002 | ......... B23B 31/117 |
| EP | 890402 A1 | * | 1/1999 | ........... B23B 31/30 |
| WO | WO 00/58045 | | 5/2000 | |

* cited by examiner

Primary Examiner—Derris H. Banks
Assistant Examiner—Michael W. Talbot
(74) Attorney, Agent, or Firm—Scott D. Wofsy; Edwards & Angell, LLP

(57) ABSTRACT

The invention relates to a tool holder for receiving a tool, especially a boring, milling, or grinding tool, which can be rotated about a rotational axis and which comprises a clamping shank. In a preferred form of embodiment, said clamping shank comprises a receiving opening (9) which is centrically arranged in an end socket (7) in relation to the rotational axis, said end socket being closed in an annular manner and said receiving opening being used for the interference fit of a holding shank pertaining to the tool. The end socket (7) contains a plurality of pressure chambers which are distributed in the circumferential direction and which extend at least approximately in the direction of the rotational axis. Said pressure chambers (13) can be connected to a pressure means supply which is especially hydraulic, in order to radially expand the receiving opening (9).

24 Claims, 3 Drawing Sheets

Figure 1:
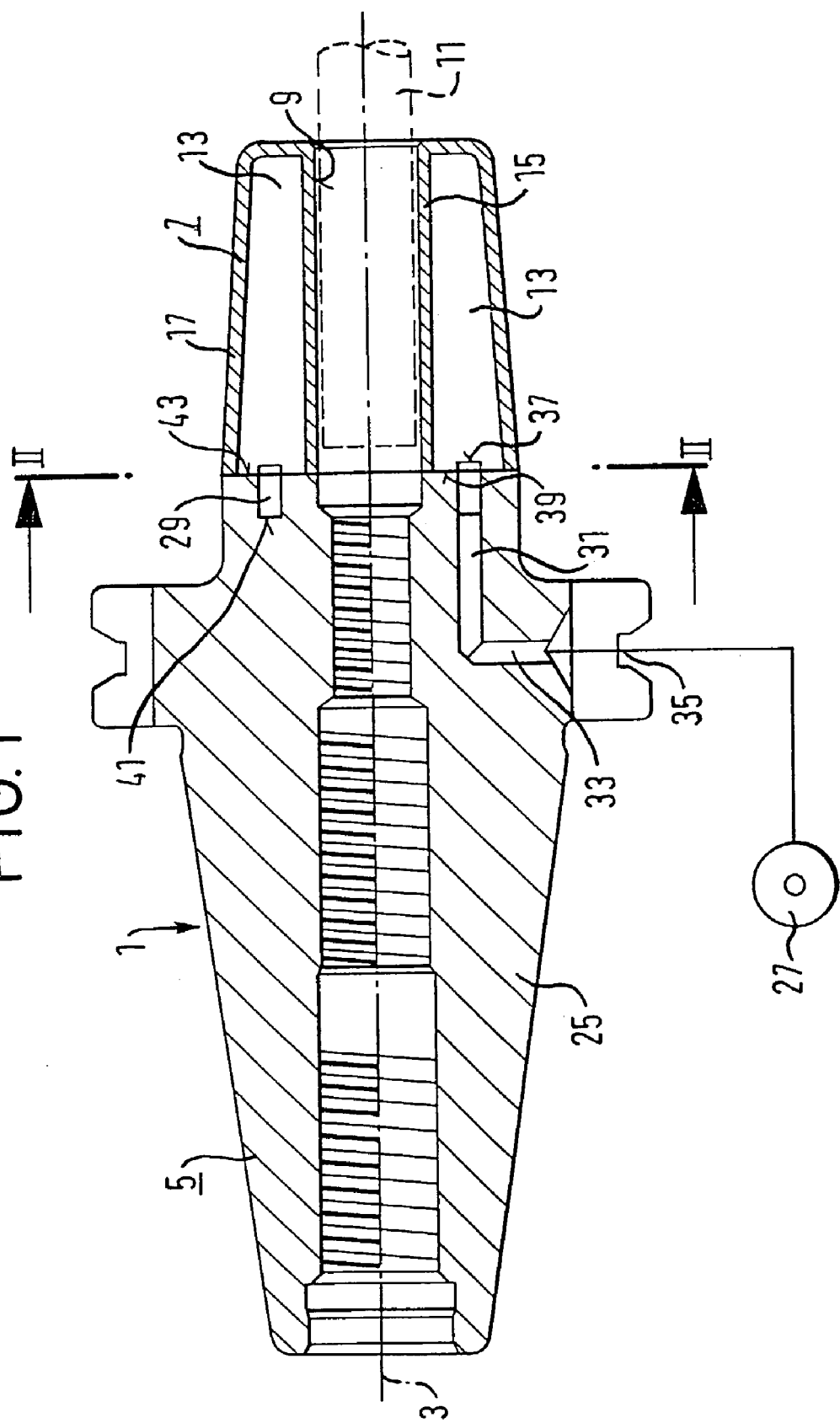

FIG. 5
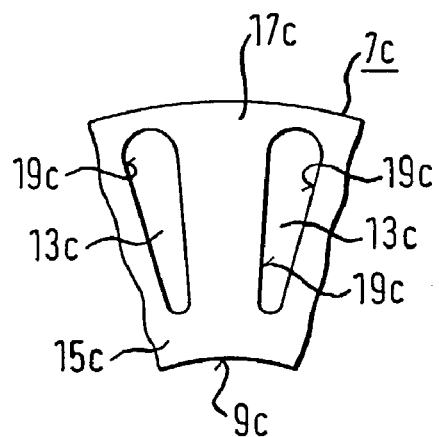
FIG. 6
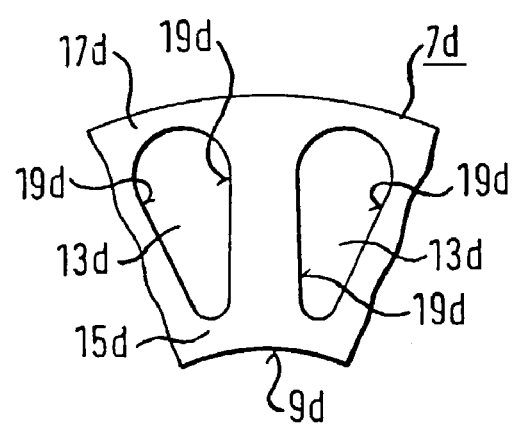
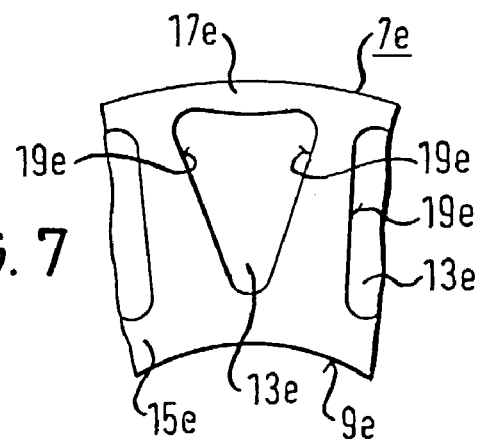
FIG. 7

TOOL HOLDER FOR A TOOL, ESPECIALLY A BORING, MILLING OR GRINDING TOOL, WHICH CAN BE ROTATED ABOUT A ROTATIONAL AXIS

The invention relates to a toolholder for a tool which rotates about an axis of rotation, in particular a drilling, milling or grinding tool.

Rotating high-precision tools, such as for example drills, but in particular milling cutters, have to be clamped in toolholders with a very high rotational accuracy, in order to obtain uniform cutting conditions at all the cutting edges of the tool. For this purpose, it is known, for example, from DE 197 08 983 A1 for the holding spindle of the tool to be received in a receiving opening, which is central with respect to the axis of rotation, of a clamping spindle. The receiving opening is provided in an end sleeve, which forms a continuous ring, of the clamping spindle. The end sleeve has a multiplicity of spreading passages which are distributed in the circumferential direction and are open radially outward. To insert the tool, spreading bodies are pressed into the spreading passages. This is associated with radial widening of the receiving opening, allowing the tool to be inserted. If the spreading bodies are then removed, the receiving opening narrows again. The tool is then in a press fit in the end sleeve. To remove the tool, the spreading bodies have to be pressed back into the spreading passages, with the result that the press fit is eliminated. Repeated introduction of the spreading bodies into the spreading passages may lead to an increase in the cross section of the spreading passages, specifically caused on the one hand by abrasion effects at the walls of the spreading passages and on the other hand by undesirable plastic deformation of the passage walls as a result of the considerable pressing forces. This may lead to it no longer being possible for the receiving opening to be widened to an extent required to eliminate the press fit, which ultimately means that the toolholder has to be replaced.

Accordingly, the invention is based on the technical problem of providing a toolholder which is certain to be able to function reliably over a prolonged service life.

In solving this problem, the invention is based on a toolholder for a tool which can rotate about an axis of rotation, in particular a drilling, milling or grinding tool, comprising a clamping spindle, which in an end-side spindle region has a receiving opening, which is central with respect to the axis of rotation, for receiving a holding spindle of the tool, clamping surfaces for press-fit holding of the holding spindle of the tool being arranged on the outer circumferential surface of the receiving opening.

According to the invention, it is provided that a pressure chamber system, which can be connected to an in particular hydraulic pressure-medium supply in order to radially spread apart the clamping surfaces, is formed in the clamping spindle. In a toolholder of this type, an in particular hydraulic pressure medium is introduced into the pressure chamber system, in order to increase the diameter of the receiving opening and to eliminate the press fit of the holding spindle of the tool, if the tool is clamped therein. The pressure medium causes a spreading force to be produced in the pressure chambers of the pressure chamber system, causing the pressure chambers to spread apart. It has been found that with a suitable configuration and location of the pressure chambers, the clamping spindle can be elastically deformed by these spreading forces, and as a corollary effect the clamping surfaces are moved radially outward. The deformation is reversible, and consequently, when the load is relieved on the pressure chamber system, the clamping surfaces return to their original position, which corresponds to the press fit of the tool-holding spindle.

Mechanical friction and associated wear to the walls of the pressure chamber system do not occur in the solution according to the invention. Also, when pressure medium is being introduced, the spreading force which is produced in the pressure chamber system is distributed uniformly over all the wall sections of the pressure chamber system, so that there are no excessive local pressures which could lead to local plastic pinch deformation. Even after the load has been applied to and removed from the pressure chamber system a large number of times, precise widening of the receiving opening is reproducible at any time. The introduction and removal of the pressure medium can be carried out within a very short time, making the machine tool which is equipped with the toolholder highly economically viable.

Hydraulic actuation of the expansion chucks for holding tools is already known per se, for example from a brochure "Dehnspannfutter" [Expansion Chucks] produced by Fritz Schunk GmbH, Fabrik für Spann-und Greifwerkzeuge, brochure No. 9900 029-15M -08/96. The expansion chucks shown in that document have an end sleeve which is in the form of a continuous ring and has a receiving opening for the holding spindle of the tool which is to be clamped. A radially inner region of the end sleeve, which forms the circumferential surface of the receiving opening, is of diaphragm-like design. In the normal state, the internal diameter of this diaphragm is sufficiently great for the press fit of the holding spindle of the tool to be eliminated so that the latter can be removed or inserted. To clamp the tool in place, in the end sleeve there is a chamber system which is continuously filled with hydraulic oil and by means of which the diaphragm can be moved radially inward in order to generate the press fit. A piston which can be actuated externally by means of a setscrew makes it possible to influence the hydraulic pressure. The piston is sealed with respect to the chamber system by a seal. In the clamped state of the tool, therefore, in the known solution a constantly high hydraulic pressure prevails in the chamber system. This may lead to fatigue phenomena in the seal and to a drop in the clamping force of the toolholder as a result of leaks. Then, when the machine tool is operating, particularly in the case of relatively old seals or after relatively long uninterrupted working phases, there is a risk of the clamping force of the toolholder dropping below the level required to reliably clamp the tool.

There is no risk of fatigue phenomena of this nature in the solution according to the invention, since, unlike in the abovementioned Schunk solution, a high pressure only has to be built up in the pressure chamber system during the brief phases of inserting and removing the tool. This also means that there is no need to accommodate a seal in the clamping spindle, whereas in the Schunk solution this is required in order to maintain the high hydraulic pressure while working. The solution according to the invention therefore also offers design simplifications.

The clamping spindle may be formed directly by a working spindle of a machine tool. However, the clamping spindle may also be a toolholder which can be inserted into the working spindle, for example a steep-taper toolholder. The receiving opening of the clamping spindle is matched to the shape of the holding spindle of the tool and accordingly is conical or cylindrical.

In a preferred refinement of the invention, the pressure chamber system comprises a multiplicity of pressure chambers which are distributed in the circumferential direction and extend at least approximately axially in the end-side spindle region of the clamping spindle. These may all be distributed along a line of a circle which is concentric with respect to the axis of rotation. However, it is also conceivable for at least some of the pressure chambers to be radially offset with respect to one another. In this context, it is even possible for at least some of the pressure chambers to have different cross-sectional sizes and/or cross-sectional shapes, in order to be able to deliberately influence the magnitude and location of the deformation forces which are produced in the clamping spindle.

To make it easier to spread open the pressure chambers, the clamping spindle may include additional material-weakening zones adjacent to the pressure chambers. These may be formed by cavities, for example by axial bores. However, chambers which are at least partially filled with a flexible material, for example rubber, are also conceivable, however. The material-weakening zones form yielding zones into which the material regions of the clamping spindle which adjoin the pressure chambers can be displaced particularly easily when pressure medium is introduced into the pressure chambers.

According to a structurally simple refinement of the invention, the end-side spindle region of the clamping spindle is formed by an end sleeve which is in the form of a continuous ring and in particular comprises a single piece, and the inner circumferential surface of which forms the clamping surfaces, and the pressure chamber system in the end sleeve comprises a multiplicity of pressure chambers which are distributed in the circumferential direction and extend at least approximately axially, in such a manner that the end sleeve can be widened in the radial direction as a result of pressure medium being introduced into the pressure chambers.

Expediently, the pressure chambers are machined axially into the end sleeve and are radially closed with respect to the outer circumferential surface of the end sleeve. It is recommended for the pressure chambers to be axially closed with respect to the free axial end of the end sleeve, in order to avoid space problems with the tool when connecting the pressure medium supply.

It is particularly simple to form the pressure chambers into the end sleeve if the end sleeve is produced separately from a base body of the clamping spindle and is fixedly connected to the base body as a result of an axial end face of the end sleeve bearing against an axial bearing surface of the base body. In this case, it is then possible for the pressure chambers to be machined axially into the end sleeve from that end face of the end sleeve which axially faces the base body and to be connected to a feed passage system, which is formed in the clamping spindle and leads to at least one pressure medium inlet connection of the clamping spindle, in an axial boundary region between end sleeve and base body. In this way, it is possible, in a structurally simple way, for the pressure chambers to be tightly encapsulated in the clamping spindle.

To widen the receiving opening, it is conceivable for the pressure chambers to be fed with pressure medium individually or in groups successively over the course of time, for example in such a manner that pressure chambers which lie diametrically opposite one another are successively pressurized in pairs, or that groups of three or more pressure chambers which are distributed over the circumference are pressurized successively in groups. For this purpose, the supply channel system can connect the pressure chambers to one another at least in groups. It is then possible for a plurality of pressure-medium inlet connections to be provided on the clamping spindle. However, the tool can be inserted and removed particularly quickly if all the pressure chambers are fed with pressure medium simultaneously. For this purpose, the supply passage system will then connect all the pressure chambers to one another.

The feed passage system may comprise at least one distributor passage which runs in the circumferential direction in the axial boundary region and intersects at least some of the pressure chambers, in particular all the pressure chambers. Preferably, the distributor passage is formed by an annular recess in the axial end face of the end sleeve and/or in the axial bearing surface of the base body. In this way, it can be produced particularly easily by milling the end face of the end sleeve or the bearing surface of the base body.

Although the pressure-medium inlet connection may in principle be provided on the end sleeve, according to a preferred solution, the pressure medium inlet connection is formed on the base body.

When shaping the pressure chambers, it should be ensured that the spreading open of the pressure chambers, which is brought about as a result of the increase in pressure, manifests itself, in particular in the circumferential direction, as an increase in the diameter of the receiving opening. The radial widening of the receiving opening does not have to take place at directly the same time as the spreading of the pressure chambers, but rather may establish itself only after the pressure chambers have been spread open, as a result of elasticity of the material of the clamping spindle. In the context of the requirement which has just been referred to, a configuration of the pressure chambers in which the latter are formed as slots which extend at least approximately in the direction of the axis of rotation and are elongate when considered in a section perpendicular to the axis, has proven expedient. In particular, in this case the slots may extend substantially radially when considered in a section which is perpendicular to the axis. However, good results have also been achieved if the slots run obliquely with respect to the radial, in particular are curved in the circumferential direction, when considered in a section which is perpendicular to the axis.

At their radially outer ends, the slots may open out into cylindrical bores which extend at least approximately in the direction of the axis of rotation. These bores allow all the axial regions of the pressure chambers to be supplied with pressure medium quickly and substantially at the same time. If they are shaped appropriately, they may in addition make it easier to spread open the pressure chambers in the circumferential direction.

Particularly good results have been achieved if the slot walls, which lie opposite one another in the circumferential direction, of the slots each run substantially parallel to one another.

Alternatively, however, it is also possible for the pressure chambers to taper radially inward in a wedge shape when viewed in a section which is perpendicular to the axis. In particular, the pressure chambers may be at least approximately triangular or drop-shaped when viewed in a section which is perpendicular to the axis.

The specific configuration of the pressure chambers will in the specific case depend inter alia on the material of the clamping spindle and its deformation properties, on the desired extent of the radial widening of the receiving opening and on the position of the pressure chambers in the clamping spindle. In practice, a design rule according to which pressure chambers which adjoin one another in the circumferential direction are to be at a circumferential distance from one another which increases in the radially outward direction has led to good results. Adjacent pressure chambers, in the radially outward direction, should at least tend to be at a greater circumferential distance from one another. Local reductions in distance do not necessarily have to have an adverse effect on the result of the widening of the receiving opening.

Figure 2:
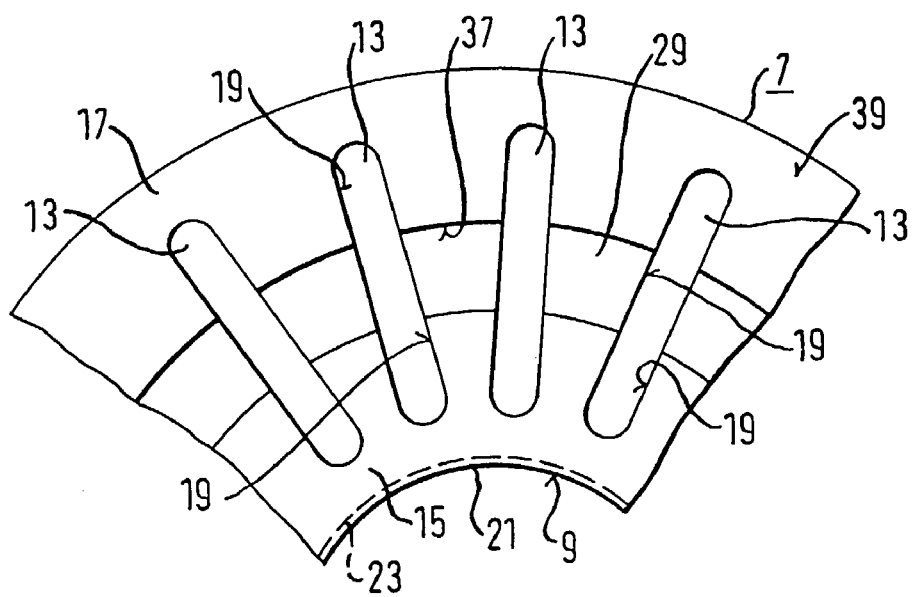

The invention is explained in more detail below with reference to the appended drawings, in which:

FIG. 1 shows an axial longitudinal section through an embodiment of the toolholder according to the invention, FIG. 2 shows an excerpt of a cross-sectional view through the toolholder as shown on line II—II from FIG. 1, and FIGS. 3–7 show a number of variants with respect to the configuration of the pressure chambers of the toolholder shown in FIG. 2.

FIGS. 1 and 2 show a steep-taper toolholder with a clamping spindle 1 which, at an end remote from the tool, has a steep taper 5 which is central with respect to its axis of rotation 3 and by means of which it can be inserted in a rotationally fixed manner into a complementary steep-taper receiving part of a working spindle, which is not shown in more detail and rotates coaxially with respect to the axis of rotation 3, of a machine tool, in particular a milling, drilling or grinding machine tool. At an end close to the tool, the clamping spindle 1 is designed with an end sleeve 7, which includes a receiving opening 9, which is central with respect to the axis of rotation 3, for holding a holding spindle 11, which is indicated by dashed lines, of a rotating tool, in particular a milling, drilling or grinding tool, with a press fit. The holding spindle 11 may be of cylindrical or conical design; the end sleeve 7 has a complementary inner lateral surface shape with mating dimensions which hold that region of the holding spindle 11 which engages in the receiving opening 9 in a press fit.

To allow the holding spindle 11 to be removed from or introduced into the receiving opening 9, a multiplicity of pressure chambers 13, which extend approximately axially, i.e. in the direction of the axis of rotation 3, and surround a sleeve region 15 which is in the form of a continuous ring and the inner lateral surface of which forms the receiving opening 9, are formed into the end sleeve 7, distributed uniformly in the circumferential direction. The pressure chambers 13 are likewise radially closed with respect to the outer lateral surface of the end sleeve 7, i.e. are surrounded by a radially outer sleeve region 17 in the form of a continuous ring. As will be explained in more detail below, the region 15 which is in the form of a continuous ring, and therefore the diameter of the receiving opening 9, can be radially widened, by increasing the pressure in the pressure chambers 13, to such an extent that the holding spindle 11 of the tool can be freed from its press fit and removed from or fitted into the receiving opening 9.

As shown in FIG. 2, in this exemplary embodiment the pressure chambers 13 are formed by radial slots which are completely surrounded by the material of the end sleeve 7 and are elongate in the radial direction when viewed in a section which is perpendicular to the axis. The ratio of the radial length of the slots 13 to their width in the circumferential direction may, for example, lie in a range between 5:1 and 10:1 and is preferably approximately 7:1. Lying opposite one another in the circumferential direction, the slots 13 have slot walls 19 which run substantially parallel to one another, act as spreading surfaces and are spread apart form one another when the pressure in the slots 13 is increased. To maintain a small spreading action in the radial direction, the slots 13 are designed to be slender and rounded at their radial inner ends, and if appropriate also in the radial outward direction; they may even be designed to taper to a point.

FIG. 2 shows the conditions prior to the application of a fluid pressure in the slots 13, the receiving opening 9 having an internal diameter which allows the press fit of the holding spindle 11. To enable the internal diameter of the receiving opening 9 to be widened to a size which eliminates the press fit, a pressure fluid, which will almost always be a hydraulic fluid, is introduced into the slots 13. The fluid pressure which then prevails in the slots 13 widens the slots 13 in the circumferential direction. As a result of the slots 13 spreading open, the inner sleeve region 15 is widened in the radial direction by an amount which eliminates the press fit. A solid line 21 in FIG. 2 shows the original contour of the internal diameter, allowing the press fit, of the receiving opening 9, while a dashed line 23 illustrates the widened contour of the receiving opening 9. In practice, the widening amounts, for example, to the order of magnitude of a few tens of μm, which is sufficient to eliminate the press fit. The deformation of the end sleeve 7 which leads to the increase in its internal diameter takes place in the elastic range, and consequently when the load on the slots 13 produced by the fluid pressure is relieved, the radial inner sleeve region 15 is narrowed again to its original dimension.

In order for the slots 13, which are axially closed even toward the free end of the end sleeve 7, to be formed, the end sleeve 7 is a separately produced component, into which the slots 13 are machined from the axial side which is remote from the tool, for example by erosion. The end sleeve 7 which has been prepared in this way is connected in a fixed and leaktight manner to a base body 25 of the clamping spindle 1, for example by friction welding. To connect the slots 13 to a pressure fluid source 27, which in FIG. 1 is illustrated as a hydraulic source, a distributor passage 29, which intersects all the slots 13, is in the form of a continuous ring and is connected to a pressurized-fluid connection 35 provided on the external circumference of the clamping spindle 1 via an axial feed passage 31, which opens out into the distributor passage 29, and a radial branch passage 33 connected thereto, is provided in the axial connecting region between the end sleeve 7 and the base body 25. To form the distributor passage 29, before the end sleeve 7 is connected to the base body 25 an annular cutout 37 is machined into that end face 39 of the end sleeve 7 which axially faces the base body 25 and/or an annular recess 41 is machined into a planar bearing surface 43, which axially faces the end sleeve 7, of the base body 25, expediently by milling.

FIGS. 3–7 show design variants relating to the slot-like pressure chambers 13 shown in FIG. 2. Components which are identical or have an identical function are provided with the same reference symbols as in FIGS. 1 and 2, but with the addition of a lower-case letter. To avoid repetition, the following text deals substantially only with differences from the exemplary embodiment described above.

Figure 3:
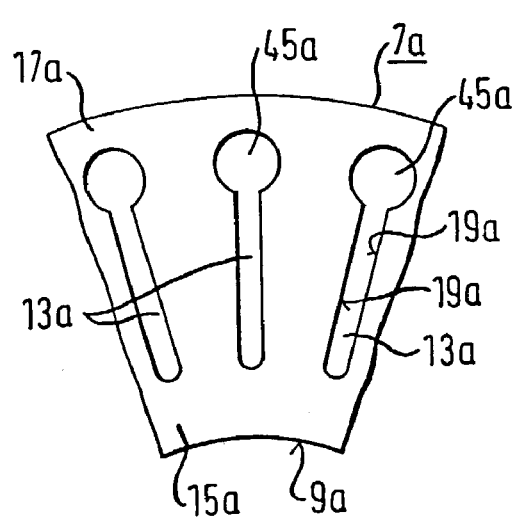

FIG. 3 shows a variant with pressure chambers 13a which extend at least approximately in the axial direction and, as in FIG. 2, are formed by radial slots which are elongate when viewed in a section which is perpendicular to the axis but at their radially outer ends each open out into a cylindrical bore 45a which extends at least approximately in the axial direction. The cross section of the cylindrical bores 45a, which is larger than that of the narrow slot region of the pressure chambers 13a, allows a rapid supply of pressure fluid even to those axial regions of the pressure chambers 13a which lie furthest away from the feed point. Moreover, the cylindrical bores 45a reduce the cross section of material of the end sleeve 7a in the radially outer region, making it easier to spread open the pressure chambers 13a.

Figure 4:
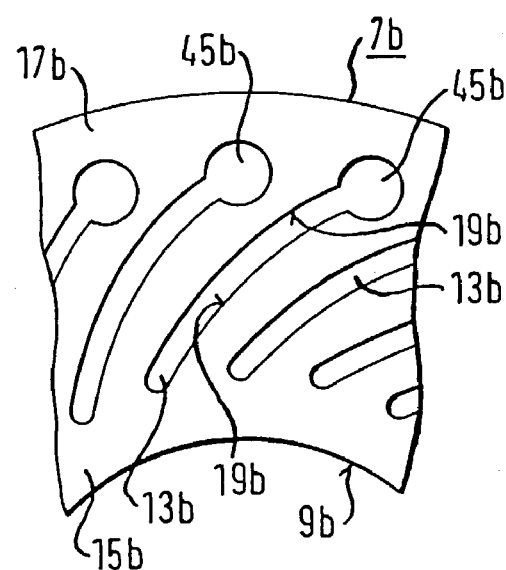

FIG. 4 shows a variant with pressure chambers 13b which, as in FIG. 3, are designed in the form of slots and are continued at their radially outer ends by cylindrical bores 45b. However, the pressure chambers 13b do not extend in the radial direction, but rather are curved with respect to the radial direction. Particularly in their radially inner region, the pressure chambers 13b should not be excessively inclined in the circumferential direction, in order to continue to obtain a sufficient spreading component in the circumferential direction.

In the variant shown in FIG. 5, there are pressure chambers 13c of which the chamber walls 19c which lie opposite one another in the circumferential direction and act as spreading surfaces run toward one another in the radially inward direction. Therefore, when viewed in a section which is perpendicular to the axis, the pressure chambers 13c are approximately in the shape of wedges which narrow slightly in the radially inward direction and extend in the radial direction.

The variant shown in FIG. 6 differs from the embodiment shown in FIG. 5 in that the wedge angle between the chamber walls 19d of the pressure chambers 13d which lie opposite one another in the circumferential direction is even more pronounced. On the radially outer side, the pressure chambers 13d are relatively strongly rounded, with the result that they are in the shape of a drop or egg when viewed in section.

FIG. 7 shows a variant with pressure chambers 13e whose mutually opposite chamber walls 19e include a wedge angle with one another, as in FIGS. 5 and 6, but which are not rounded on the radially outer side, but rather are designed to be approximately triangular overall when viewed in section.

In the embodiments explained above, the pressure chambers are at least partially spread in the circumferential direction. Especially in the case of the embodiment shown in FIG. 4, the profile of the pressure chambers which is inclined with respect to the radial means that a radial spreading component is also observed. This demonstrates that various configurations of the pressure chambers, which have correspondingly different spreading characteristics of the pressure chambers, can lead to the desired result, namely radial widening of the receiving opening. Therefore, in general terms, configurations of the pressure chambers are possible in which purely circumferential spreading of the pressure chambers occurs, but it is also possible to use configurations in which combined spreading of the pressure chambers both in the radial direction and in the circumferential direction is observed. A solution in which predominantly or substantially exclusively radial spreading of the pressure chambers is observed should also not be ruled out.

What is claimed is:

1. A toolholder for a tool which can rotate about an axis of rotation, in particular a drilling, milling or grinding tool, comprising:
a clamping spindle, which in an end-side spindle region has a receiving opening, which is central with respect to the axis of rotation, for receiving a holding spindle of the tool, clamping surfaces for press-fit holding of the holding spindle of the tool being arranged on the outer circumferential surface of the receiving opening, wherein a pressure chamber system, which can be connected to a hydraulic pressure-medium supply in order to radially spread apart the clamping surfaces, is formed in the clamping spindle, wherein the pressure chamber system includes a multiplicity of pressure chambers which are distributed in the circumferential direction and extend at least approximately axially in the end-side spindle region of the clamping spindle.

2. The toolholder as claimed in claim 1, wherein all the pressure chambers are distributed along the line of a circle which is concentric with respect to the axis of rotation.

3. The toolholder as claimed in claim 1, wherein at least some of the pressure chambers are radially offset with respect to one another.

4. The toolholder as claimed in claim 1, wherein at least some of the pressure chambers have different cross-sectional sizes and/or cross-sectional shapes.

5. The toolholder as claimed in claim 1, wherein the clamping spindle includes additional material-weakening zones adjacent to the pressure chambers.

6. The toolholder as claimed in claim 1, wherein the end-side spindle region the clamping spindle is formed by an end sleeve which is in the form of a continuous ring and in particular comprises a single piece, and the inner circumferential surface of which forms the clamping surfaces, and wherein the pressure chamber system in the end sleeve comprises a multiplicity of pressure chambers which are distributed in the circumferential direction and extend at least approximately axially, in such a manner that the end sleeve can be widened in the radial direction as a result of pressure medium being introduced into the pressure chambers.

7. The toolholder as claimed in claim 6, wherein the pressure chambers are machined axially into the end sleeve and are radially closed with respect to the outer circumferential surface of the end sleeve.

8. The toolholder as claimed in claim 6, wherein the pressure chambers are axially closed with respect to the free axial end of the end sleeve.

9. The toolholder as claimed in claim 6, wherein the end sleeve is produced separately from a base body of the clamping spindle and is fixedly connected to the base body as a result of an axial end face of the end sleeve bearing against an axial bearing surface of the base body.

10. The toolholder as claimed in claim 9, wherein the pressure chambers are machined axially into the end sleeve from that end face of the end sleeve which axially faces the base body and are connected to a feed passage system which is formed in the clamping spindle and leads to at least one pressure medium inlet connection the clamping spindle, in an axial boundary region between end sleeve and base body.

11. The toolholder as claimed in claim 10, wherein the feed passage system connects the pressure chambers to one another at least in groups.

12. The toolholder as claimed in claim 11, wherein the feed passage system connects all the pressure chambers to one another.

13. The toolholder as claimed in claim 11, wherein the feed passage system comprises at least one distributor passage which runs in the circumferential direction in the axial boundary region and intersects at least some of the pressure chambers, in particular all the pressure chambers.

14. The toolholder as claimed in claim 13, wherein the distributor passage is formed by an annular recess in the axial end face of the end sleeve and/or in the axial bearing surface of the base body.

15. The toolholder as claimed in claim 14, wherein the pressure medium inlet connection is formed on the base body.

16. The toolholder as claimed in claim 15, wherein the pressure chambers are formed as slots which extend at least approximately in the direction of the axis of rotation and are elongate when considered in a section perpendicular to the axis.

17. The toolholder as claimed in claim 16, wherein the slots extend substantially radially when considered in a section which is perpendicular to the axis.

18. The toolholder as claimed in claim 16, wherein the slots run obliquely with respect to the radial, in particular are curved in the circumferential direction, when considered in a section which is perpendicular to the axis.

19. The toolholder as claimed in claim 18, wherein the slots, at their radially outer ends, open out into cylindrical bores which extend at least approximately in the direction of the axis of rotation.

20. The toolholder as claimed in claim 19, wherein the slot walls, which lie opposite one another in the circumferential direction, of the slots each run substantially parallel to one another.

21. The toolholder as claimed in claim 19, wherein the pressure chambers taper radially inward in a wedge shape when viewed in a section which is perpendicular to the axis.

22. The toolholder as claimed in claim 21, wherein the pressure chambers are at least approximately triangular when viewed in a section which is perpendicular to the axis.

23. The toolholder as claimed in claim 21, wherein the pressure chambers are at least approximately drop-shaped when viewed in a section which is perpendicular to the axis.

24. The toolholder as claimed in claim 23, wherein pressure chambers which adjoin one another in the circumferential direction are at a circumferential distance from one another which increases in the radially outward direction.

* * * * *